F. T. SNYDER.
PROCESS OF BAKING.
APPLICATION FILED JULY 30, 1919.
1,414,439.
Patented May 2, 1922.
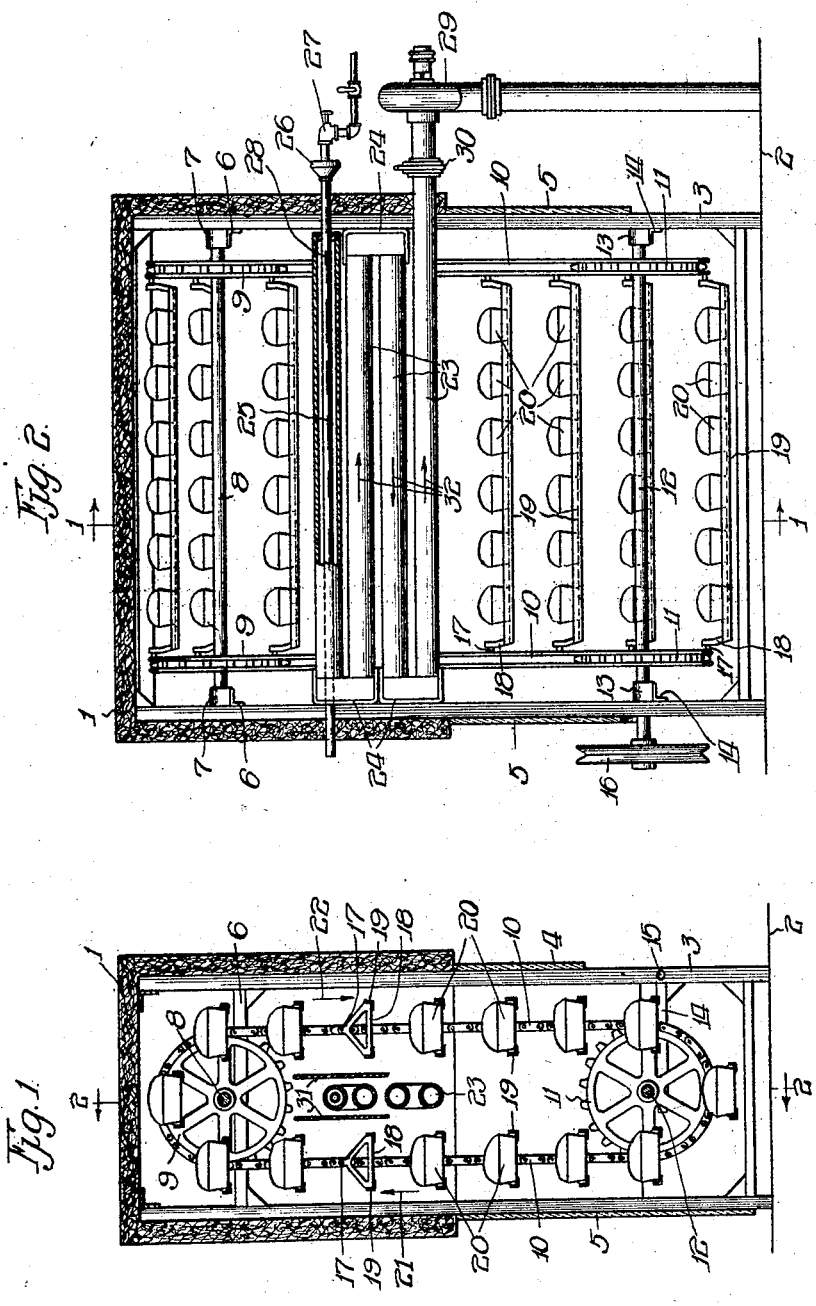
Inventor:
Frederick T. Snyder,
By G. L. Gragg
Atty.

UNITED STATES PATENT OFFICE.

FREDERICK T. SNYDER, OF OAK PARK, ILLINOIS, ASSIGNOR TO S. D. FLOOD, OF CHICAGO, ILLINOIS.

PROCESS OF BAKING.

1,414,439.  Specification of Letters Patent.  Patented May 2, 1922.

Application filed July 30, 1919. Serial No. 314,254.

*To all whom it may concern:*

Be it known that I, FREDERICK T. SNYDER, citizen of the United States, residing at Oak Park, in the county of Cook and State of Illinois, have invented a certain new and useful Improvement in Processes of Baking, of which the following is a full, clear, concise, and exact description.

My invention relates to the method of baking and especially to the baking of bread. The invention has several objects and a large number of advantages. In accordance with one feature of the invention a body of air is confined and brought to baking heat, the material to be baked passing upwardly into said body of air. The lower portion of the body of air is preferably brought to non-baking or proofing temperature. In the preferred embodiment of the invention the dough or other material is baked in one journey thereof through this air and in which journey the so-called proofing or other treatment may also be effected if desired.

In carrying out various objects of my invention the interior of the baking chamber is excluded from communication with the exterior air except at its bottom where the material to be baked enters and leaves the chamber. The air within the baking chamber is, therefore, very slowly, if at all, changed so that it may ultimately become saturated with the essential oils that flavor the bread and also with moisture so that none of the essential oils nor the moisture contained in the dough entering the chamber will be given up by the bread. The bread will remain fresh longer than would be the case where moisture is extracted in the baking operation, and will retain its aroma and flavor due to its retention of the essential oils. If desired, the air within the baking chamber may be initially saturated with moisture from water placed in some of the baking pans that are passed through the heating chamber.

The invention may be practiced with the aid of suitable apparatus such as shown in the accompanying drawing in connection with which features of the invention will be fully set forth. In the drawings Fig. 1 is a sectional view on line 1—1 of Fig. 2 and Fig. 2 is a sectional view on line 2—2 of Fig. 1.

Like parts are indicated by similar characters of reference throughout both figures.

The invention will be specifically described when employed in baking bread, though it is to be understood that the invention is not to be restricted to any use.

The baking chamber 1 is closed at its top and sides and is open at its bottom. The walls of this chamber are constructed to prevent material radiation of heat therethrough and to avoid leakage as far as possible. The chamber is preferably higher than it is long and longer than it is wide. This chamber is elevated or spaced apart from the floor or other support 2 by means of its upright legs 3 which are preferably continued up into the chamber to constitute a part of its structural framework. An apron 4, preferably of glass, is at the side of the apparatus where the material to be baked is introduced, this apron extending from the chamber 1 part way toward the floor to leave sufficient open space between its bottom edge and the floor through which the material to be baked is passed into and removed from the apparatus. Other aprons 5, on the other sides of the apparatus, also preferably of glass, extend downwardly from the chamber 1. Proofing of the dough is observed through the aprons or transparent walls of the proofing chamber. The horizontal transverse bases 6 within and at the ends of the chamber are secured to the legs 3 and support the bearings 7 for the horizontal idler shaft 8 that extends longitudinally of the structure and upon the ends of which shaft are fixed two idler sprocket wheels 9. Upright driven sprocket chains 10 are in mesh with these sprocket wheels that are in the upper bights of the chains. Chain driving sprocket wheels 11 are in mesh with said chains and are disposed in the lower bights thereof. The wheels 11 are fixed upon the lower horizontal driving shaft 12 mounted in bearings 13 supported upon the inner ends of the swinging horizontal transverse arms 14 which are pivotally secured at their outer ends to two of the legs 3 at 15. The bearings may be bushed with solid hard graphite that is self-lubricating at all temperature to avoid the use of oil. The lower shaft is thus the driving shaft and the upper shaft is an idler, the latter not having to pass through the baking chamber in order to have driving connection with the power transmitting means. The driving shaft 12, together with the sprocket wheels 11 thereon and the lower bights of the sprocket chains, are thus arranged to float, being movable up and down as the chains vary in length when the apparatus is being raised to or lowered from desired baking heat. The tendency of the sprocket chains to depart outwardly from the pitch circles is also compensated for by this arrangement. The shaft 12 is slowly driven by any suitable means, as for example by the driving pulley 16 fixed thereupon.

For the baking of bread there are provided horizontally aligned supporting pivot pins 17 upon the two chains, these pins being desirably spaced about a foot apart on each chain. A tray or carrier is mounted to be horizontal upon each pair of co-axial pivot pins upon which it swings at the chain bights to maintain it horizontal. The trays are preferably formed of triangular end frames 18 joined by longitudinal horizontal angle irons 19 arranged to have their sides horizontal and upright, the horizontal sides constituting ledges upon which baking pans 20, containing the dough to be baked, are disposed. The chains are so driven that they move downward where nearer the glass apron 4, consequently moving up into the baking chamber where they are nearer the rear apron 5, all as indicated by the arrows 21, 22. The dough laden baking pans are placed upon each tray when it is sufficiently below the apron 4, the minor heat in the space between the aprons 4 and 5 quickening the raising or proofing of the bread, this proofing being preferably entirely completed before the dough is introduced into the baking chamber. The dough and the bread resulting therefrom are carried by the conveying mechanism through an orbit partially enclosed by the baking chamber and partially enclosed by the proofing chamber, both of these chambers serving to enclose said orbit. The source of heat that brings the baking chamber to baking heat and the proofing chamber to proofing heat is enclosed by this orbit as will appear. In the equipment illustrated it would require an hour and a quarter to pass each tray from its loading point just below the apron 4 back to this point where the baked bread is unloaded from the tray. This allows sufficient time for the dough to raise or proof before entering the baking chamber, and also allows sufficient time within the baking chamber to bake the dough into bread.

The heat is preferably furnished to the equipment with the aid of heating pipes 23, superimposed in relation to each other, and whose bores are joined by the hollow heads 24 to form a sinuous or zig-zag shaped heat conducting passage. These pipes are located within the orbit of travel of the loaves and above the open bottom of the baking chamber so that the source of heat which they constitute is located in the trapped space within said chamber. A gas pipe 25 is within and extends along the uppermost pipe 23, this gas pipe having one end extending through one head 24 where it is open to receive air and having its other end extending through another head 24 where the gas pipe is supplied with gas. A gas burner 26 is located at the latter end of the gas pipe 25, and air may also be admitted at this burner to this pipe. Primary air enters the gas pipe through the burner or mixer as usual, secondary air passing through the gas pipe and being heated by the surrounding flame preparatory to its intermixture with the gas. A gas valve 27 regulates the supply of gas to the burner 26. The gas and air mix in the gas pipe 25, products of combustion passing through the lateral holes 28 in this pipe into the sinuous heating passage afforded by the heating pipes 23 and the heads 24 joining the bores of these pipes, these products of combustion issuing through the outer end of the lowermost heating pipe 23. Heat is gradually given up by the products of combustion as they travel toward their outlet where they emerge cooled below baking temperature. A suction fan 29 may be employed to promote the downward flow of the products of combustion through the piping 23, 24, this flow being regulable by a valve 30.

The piping 23, 24 is arranged between and spaced apart on both sides from the shields 31. The shields 31, made preferably of sheet iron one-sixteenth of an inch in thickness, direct heat to the bottoms of the pans, the bread thus being cooked better than hitherto. These shields project above the source of heat to direct the heat therefrom to the pans, the portions of the dough or bread outside of the pans being shielded from this heat whereby the crust of the bread is uniformly browned. The inner surface portions of the baking chamber are desirably upon a non-metallic mineral substance such as asbestos to avoid undue expansion or contraction while enabling it to be properly subject to the heat without impairing the effectiveness of the heat.

By arranging the movement of the products of combustion in a downward direction, the travel of the hotter and lighter portions of the gases of combustion is retarded by gravitation, until they have given up their heat also and so become as heavy as the cooler gases. Very economical heating is thus secured. None of the gases of combustion come in contact with the bread being baked, there being no passage between the piping 23, 24 and the interior of the baking chamber 1 to spoil its flavor and aroma. By adjusting the relative amount of the air supplied at the open end of pipe 25 and at the burner 26, the burning of the gas can be distributed evenly through the length of the burner pipe 25, in this way heating the uppermost heating pipe 23 uniformly along its length. As the gases of combustion pass alternately across the baking chamber in opposite directions, as shown by the arrows 32, the heat is uniformly distributed across the baking chamber and is progressively increased upwardly in the baking chamber.

The dough in the pans that move from the receiving place below the apron 4 prior to its receipt within the baking chamber, is subject to the heat radiated downwardly from the lowermost heating pipe 23 and the interior of the baking chamber 1, the radiated heat being partially temporarily trapped between the aprons 4 and 5. The complete raising of the dough results from this radiated heat which puts the dough in finished condition for baking. Each tray takes about forty-five minutes to pass through the baking chamber and emerges as completely baked bread on the down going side of the chains. The emerging bread radiates heat to the upgoing dough in this way, thereby helping to raise or proof it. As the bread comes down it enters layers of air in the baking chamber of progressively lower temperatures, and gives up much of its heat to this cooler air, which in turn, transfers this heat to the fresh pans of dough coming up on the other side, thereby conserving much of the heat that is lost in the usual form of baking chamber from which the bread is taken at its highest temperature. As the bread passes practically entirely around the burner pipes, all sides and ends of the loaves, as well as the tops and bottoms thereof, are uniformly exposed to the radiated heat of the hottest topmost heating pipe 23. The result is a uniform brown crust over the entire surfaces of the loaves.

As very little heat is lost in the baking chamber by radiation or leakage, the temperature within the baking chamber is very sensitive to adjustment. A small variation in the supply of gas will make a large difference in the maximum temperature in the top of the baking chamber. The amount and color of the crust is determined by this maximum temperature. By observing the appearance of the loaves as they emerge from the baking chamber, the gas valve 27 can be adjusted to give just the color desired and as the baking chamber is a continuously operating one, this desired result is repeated indefinitely.

The flow of heat into the loaves depends mainly on their size as the better heat conductivity of heavier loaves is about offset by the greater amount of heat required per cubic inch to bring the heavier loaves up to baking temperature. Therefore the speed of chain travel employed in the baking of one kind of dough thoroughly to the center of the loaves will bake any other kind of a different degree of raising equally well. In this way variations in the raising of the bread are automatically compensated for without requiring personal attention. As each tray preferably holds from eight to twelves loaves and three or four trays can be changed at once, the attention of the baker is only required at long intervals, permitting him to be engaged in other work at other times.

In baking fruit and custard pies, the accessibility to the trays permits the liquid filling of the pies being put in after the pie pans have been placed on the trays, which reduces the loss from spilling.

While gas has been mostly used to heat the heating pipes, it is also practical to heat these pipes with liquid fuel or by introducing superheated steam, or by introducing electric resistance heaters in place of the heating pipes, arranged in the same vertical plane.

It will be observed that the air in the baking chamber is not materially replaced, wherefore it may become saturated with moisture and the essential oils in the dough so that when the dough enters the baking chamber it will not give up these ingredients which are so essential in maintaining the bread sweet, fresh, and of the proper aroma. In the prior baking processes about five percent of the moisture is given up by the dough that is being baked. The heating agency is totally excluded from communication with the interior of the baking chamber so that no injurious or objectionable substances are transferred from the source of heat to the bread that is being baked. The fresh dough that is being elevated into the baking chamber tends to cool off the air in the baking chamber. This cooled air flows downwardly past the bread that is being elevated on the rising side. The heated air flows upwardly past the descending loaves. In this way the tendency is to keep the baking conditions uniform, the cooled air and the heated air seeking their proper relation to the departing bread.

While I have herein shown and particularly described one form of apparatus for carrying out the method of my invention, it will be understood that I do not limit myself to any particular apparatus, but having thus described my invention I claim as new and desire to secure by Letters Patent the following:—

1. The process of baking consisting in confining a body of air; bringing the upper portion of the body of air to baking heat and the lower portion to proofing temperature; and passing dough upwardly through the proofing and baking portions of said body of air, the rate of progress being so proportioned that the lumps of dough are completely proofed and ready for immediate baking as they pass from one portion to another.

2. The process of baking consisting in confining a body of air; substantially saturating the air with moisture; bringing the upper portion of the body of air to baking heat and the lower portion to bread proofing temperature; and passing dough upwardly through the proofing and baking portions of said body of air, the rate of progress being so proportioned that the loaves are proofed completely just as they enter the baking portion.

3. The process of baking consisting in confining a body of air; substantially saturating the air with volatile material similar to that present in the material being baked; bringing the upper portion of the body of air to baking heat and the lower portion to proofing temperature; and passing dough upwardly through the proofing and baking portions of said body of air, the rate of progress being so proportioned that the loaves are proofed completely just as they enter the baking portion.

4. The process of baking consisting in confining a body of air; bringing the upper portion of the body of air to baking heat and causing this heat to progressively increase from the lower to the upper portion of said body of air and bringing the lower portion to proofing temperature; and passing dough upwardly through the proofing and baking portions of said body of air, the rate of progress being so proportioned that the loaves are proofed completely just as they enter the baking portion.

5. The process of baking consisting in confining a body of air; substantially saturating the air with moisture; bringing the upper portion of the body of air to baking heat and causing this heat to progressively increase from the lower to the upper portion of said body of air and bringing the lower portion to proofing temperature; and passing dough upwardly through the proofing and baking portions of said body of air, the rate of progress being so proportioned that the loaves are proofed completely just as they enter the baking portion.

6. The process of baking consisting in confining a body of air; substantially saturating the air with volatile material similar to that present in the material being baked; bringing the upper portion of the body of air to baking heat and causing this heat to progressively increase from the lower to the upper portion of said body of air and bringing the lower portion to proofing temperature; and passing dough upwardly through the proofing and baking portions of said body of air whereby completely baked and crusted bread is produced with little or no loss by evaporation of water and flavoring content.

7. The process which consists in procuring an upright elongated body of air, maintaining one end zone of said body at substantially bread baking and browning temperature, maintaining another end zone of said body of air at substantially bread raising and proofing temperature by means of heated air conveyed from the bread baking zone, introducing unproofed loaves into the said body of air at the boundary of the baking zone and into the proofing zone, moving said loaves through the proofing zone away from and towards and directly into the baking and browning zone, and removing said loaves at the boundary of the baking zone and beginning of the proofing zone, whereby loaves of bread may be baked directly after proofing and without exposure or loss of aroma.

8. The process which consists in procuring an upright body of heated air, maintaining the upper end of said body at bread baking and browning temperature, maintaining the other end at bread proofing temperature, passing formed loaves into the proofing zone at or near the beginning of said zone, causing said loaves to pass further into the proofing zone and returning them towards the baking zone and passing them in, into and out of the baking zone to effect baking, and removing them from the baking zone in or near the beginning of the proofing zone, whereby the heat of the baked bread is conserved.

9. The process of baking bread which consists in enclosing a vertically elongated body of air, heating the upper part of said air to baking temperature, and by conveyed heat of the upper body maintaining the lower part at proofing temperature, the temperatures gradually merging, passing dough down and through the proofing body and gradually into the baking body, exposing the loaves at the highest point of the latter, to browning heat, and passing the bread so browned back into the baking heat.

10. The process of baking bread economically which consists in maintaining a column of enclosed air, heating the upper end of said column to baking temperature by means of combustion in enclosed conduits, carried near the top of said upright body and discharging in a lower zone, keeping the lower end of said column at proofing temperature, by means of heat conveyed and conducted from the upper part and by the heat of baked bread, and passing loaves into and through the proofing zone and directly into and through the heated zone, whereby the heat and bread flavoring materials are conserved.

In witness whereof, I hereunto subscribe my name this 25th day of July, A. D. 1919.

FREDERICK T. SNYDER.